United States Patent [19]
Duff et al.

[11] Patent Number: 5,309,727
[45] Date of Patent: May 10, 1994

[54] REACTIVE CONTROL FOR DISCRETE CHILLER UNITS

[75] Inventors: Paul J. Duff, Lebanon; Keith G. Michaelsen, Winsted, both of Conn.

[73] Assignee: Carrier Corporation, Syracuse, N.Y.

[21] Appl. No.: 58,000

[22] Filed: May 7, 1993

[51] Int. Cl.$^5$ .............................................. F25B 7/00
[52] U.S. Cl. ....................................... 62/117; 62/201; 417/8
[58] Field of Search ............... 62/201, 117, 175, 510; 417/7, 8; 236/1 EA

[56] References Cited

U.S. PATENT DOCUMENTS

| | | | |
|---|---|---|---|
| 3,513,662 | 5/1970 | Golber | 62/175 X |
| 4,463,574 | 8/1984 | Spethmann | 236/1 EA X |
| 4,467,617 | 8/1984 | Kitauchi | 62/175 |
| 4,483,152 | 11/1984 | Bitondo | 236/1 EA |
| 5,097,670 | 3/1992 | Yoshikawa et al. | 62/175 X |

Primary Examiner—William E. Wayner

[57] ABSTRACT

System and process are disclosed for reacting to conditions that may arise in a plurality of discrete chiller units all individually controlled by dedicated control units. The system and process react to temperature conditions of the coolant when it enters and when it leaves the chiller units. The system normally supervises the manner in which the chillers are allowed to individually increase or decrease chilling capacity. The system furthermore overrides this supervisory control of the individual chiller units when the coolant entering the chiller units drops below a threshold value. The chilling capacity of all running chiller units is decreased when this latter condition occurs.

10 Claims, 10 Drawing Sheets

REACTIVE CONTROL FOR DISCRETE CHILLER UNITS

BACKGROUND OF THE INVENTION

This invention relates to the simultaneous control of several individual chiller units within a system that is processing chilled coolant via common supply and return lines. In particular, this invention relates to the control of a number of different chiller units each having their own respective dedicated control units.

Multiple chillers on a common coolant loop are subjected to the same entering coolant temperature at approximately the same time. The chillers are typically required to maintain the leaving coolant at the same temperature. This causes the individual units to simultaneously start or stop their compressors at the same time. This leads to unnecessary and at times excessive demands on electrical power consumption and excessive compressor cycling in order to provide the chilling of the coolant perceived to be necessary. In this regard, each individual chiller unit having its own particular compressor stages and control unit is trying to activate the perceived number of compressor stages necessary to achieve the desired chilling without regard to what may be happening elsewhere. This often produces an over reaction. This over action may include a significant drop in coolant temperature when increased chilling capacity has been unnecessarily added. What is needed is a control system which allows individually controlled units to provide normal control functions while at the same time supervising the reaction by the individual chiller units when certain coolant temperature conditions occur.

OBJECTS OF THE INVENTION

It is an object of the invention to provide a control that synchronizes the individual control units of each chiller in order to maintain the desired cooling.

It is another object of the invention to minimize electrical demand and eliminate unnecessary compressor cycling.

The above and other objects are achieved according to the present invention by providing a system which imposes demand limits on individual chiller control units whereby the individual units cannot simply activate or deactivate compressor stages. In the event that the capacity demands placed on the individual units need to be exceeded, the system selects which individual units are to receive changes in demand limits so as to thereby increase or decrease the number of compressor stages therein.

The system furthermore overrides the aforementioned selection of individual units when the coolant returning for further chilling drops below a certain threshold value. In this situation, the system calculates new demand limits for all of the individual units and transmits these new demand limits to the respective control units. The system monitors the temperature of the returning coolant and makes further changes to new demand limits when the temperature of the returning cooling remains below the threshold value. During this entire mode of operation, the system bypasses the monitoring of individual units for specific changes in their respective compression capacities within predefined periods of time. The normal operation wherein such monitoring occurs will resume when the temperature of the returning coolant again reaches the threshold value.

BRIEF DESCRIPTION OF THE DRAWINGS

Other objects and advantages of the present invention will be apparent from the following description in conjunction with the accompanying drawings in which.

DESCRIPTION OF PREFERRED EMBODIMENT

Figure 1:
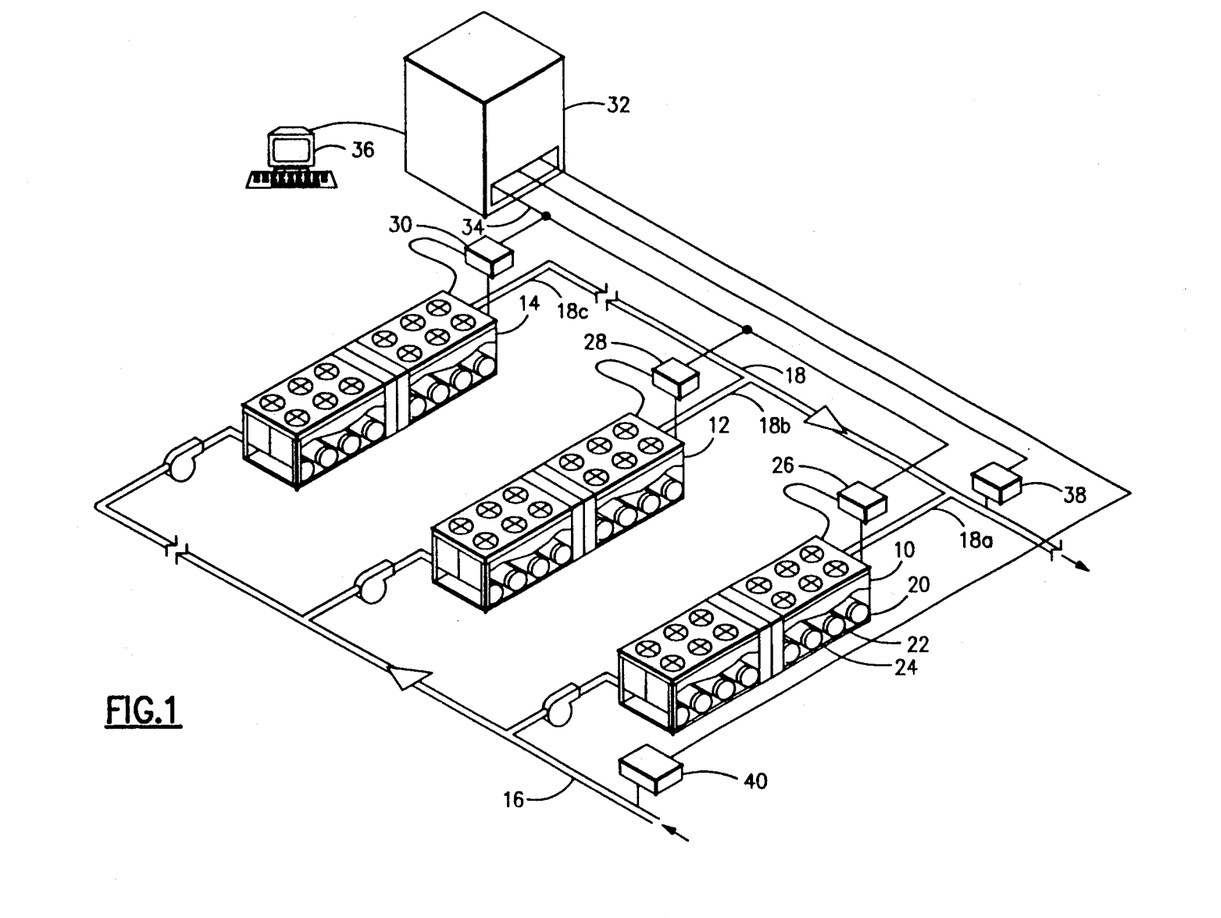
FIG. 1 illustrates a plurality of individually controlled chiller units each having a plurality of compressor stages located therein that may be activated by a supervisory control system which interfaces with the individually controlled chiller units.

Referring to FIG. 1, a series of chiller units 10, 12 and 14 are illustrated relative to a coolant return line 16 and a coolant supply line 18. The coolant will hereinafter be referred to as chilled water although it should be understood that the system would work equally well with other coolants. Each of the chiller units includes individual compressor stages such as 20, 22, and 24 for chiller unit 10 that can be individually activated by a unit controller such as 26 for chiller unit 10. In a similar manner, compressor stages can be activated by a unit controller 28 for chiller unit 12 and a unit controller 30 for the chiller unit 14. Each unit controller monitors the temperature of the chilled water in a line 18a, 18b, or 18c in order to exercise appropriate local control over the respective chiller. This local control may be in accordance with any number of well known controller methods for activating or deactivating compressors in order to achieve the desired water supply temperature. In addition to controlling the respective chiller unit, each unit controller communicates with a system controller 32 via a communication bus 34. The system controller 32 receives local unit controller information from each controller unit over the bus 34 such as chiller status, unit capacity and available capacity. The system controller also receives certain information from a user interface 36 relating to the overall system of chillers. This information includes the number of chiller units in the system, the coolant or chilled water set point, the overall system demand limit and the minimum leaving chilled water control point temperature that are to apply to each chiller control unit. The system controller also receives information about each controller unit from the user interface 36 including the particular address for each unit controller, the effective capacity and the number of stages of compression control. The system controller finally receives a chilled water supply temperature reading from a chilled water supply sensor 38 and a chilled water return temperature reading from a chilled water return sensor 40.

Figure 2:
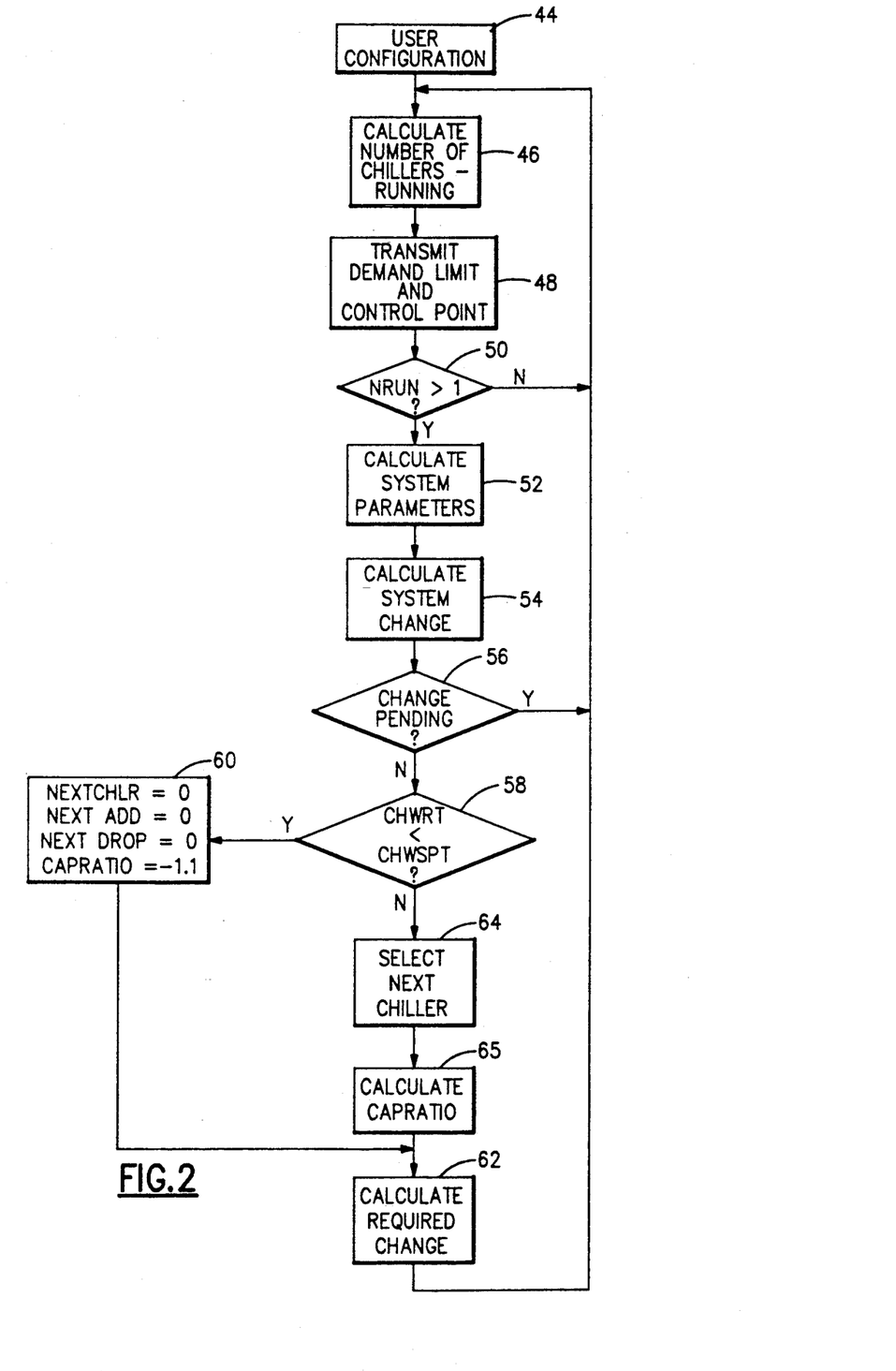
FIG. 2 is a diagram of an overall software control process residing in the supervisory control system of FIG. 1.

Referring to FIG. 2, the programmed control within control system 32 that is responsive to the aforementioned inputs is generally illustrated. It is to be understood that this programmed control resides in a computer having sufficient memory and processing rate to execute the programmed control. The program control begins with a subroutine 44 which reads the data entered at the user interface 36 and also initializes the value of certain variables that will be used later. The normal program flow is to proceed to a subroutine 46 and extract the operating data from the unit controllers 26, 28, and 30 and calculate the number of chillers actually running. An initial demand limit and leaving chilled water control point are thereafter transmitted to each of the control units. The initial demand limit which each control unit is given may not allow the activation of a sufficient number of compressor stages to meet the chilled water control point. The chillers will nonetheless attempt to maintain their respective leaving chilled water temperatures at the control point while not exceeding their respective demand limits. A step 50 simply determines whether there is more than one chiller unit operating. In the event that there is not, the control program loops around to the subroutine 46. This allows the individual operating chiller to operate under the control of its unit controller in maintaining the desired chilled water temperature.

Referring again to step 50, in the event that more than one chiller unit is active, the program proceeds in a subroutine 52 to read the chilled water supply temperature from sensor 38 and the chilled water return temperature from sensor 40 and calculate certain system parameters. The program thereafter in a step 54 determines whether the chillers have responded to any previous commanded change in compression capacity. If change is still pending, the program so notes in step 56 and returns to subroutine 46.

In the event that a system change is not pending, the program proceeds to a step 58 and determines whether the chilled water return temperature from sensor 40 is less than a chilled water supply set point temperature. If the chilled water return temperature has dropped below this set point, the program proceeds to a step 60 and sets control parameters, NEXTCHLR, NEXTADD and NEXTDROP, equal to zero. A further parameter, CAPRATIO, is set equal to −1.1. The program proceeds from step 60 to a subroutine 62 and calculates the required change to the demand limit that is necessary as a result of the parameter settings in step 60. The program loops back to subroutine 46 and transmits the required change in subroutine 48.

Referring again to subroutine 58, in the event that the chilled water return temperature at sensor 40 has not dropped below the threshold set point temperature for that sensor, the program will proceed to a subroutine 64 which selects the chillers that are to "add" or "drop" compression stages. This is determined by examining a number of conditions for each chiller unit as will be described hereinafter regarding subroutine 64. Knowing which chillers are to be changed, the program proceeds to calculate a variable CAPRATIO in a subroutine 65. As will be explained in detail hereinafter, there are a number of override conditions to the calculated value for CAPRATIO which will result in arbitrary settings being made to this variable. In any event the program will proceed to a subroutine 62 and change a selected chiller's demand limit if a change is in order as defined by the determined value of CAPRATIO. Once this occurs, the program will loop around and begin again to execute the subroutines 46-62. It is to be understood that this process will repeat itself every fifteen seconds.

Figure 3:
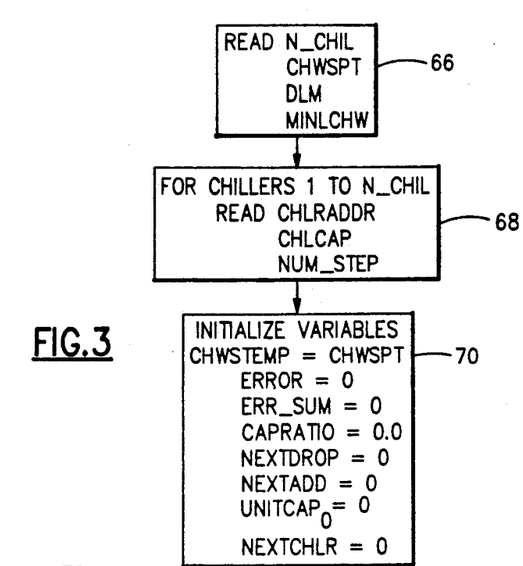
FIG. 3 is a diagram of a software routine which reads and stores information for each chiller unit of FIG. 1 as well as defining initial conditions of the entire system.

Referring to FIG. 3, the steps comprising the system configuration routine 44 of FIG. 2 are illustrated. This routine begins with a step 66 wherein the number of chillers, N_CHIL, the system chilled water set point, CHWSPT, the system demand limit, DLM, and the minimum leaving chilled water controlled point, MINLCHW, are read from the user interface 36. Since there are three chillers in FIG. 1, N_CHIL will equal three. It is to be understood that the number of chillers in the system may however be significantly greater. The system chilled water set point, CHWSPT will be set at the temperature that is to be achieved by the coolant after chilling by the chillers 10-14. This temperature will ultimately be sensed by the chilled water supply sensor 38.

The system demand limit, DLM, is the maximum percentage capacity of each chiller unit's compression capacity that may be activated by the unit controller for the system. The minimum leaving chilled water control point, MINLCHW, will be set at some minimum temperature in degrees Fahrenheit that is to be permitted for the coolant leaving each chiller unit.

The next step 68 is to read certain values for each of the individual chiller control units 26 through 30 from the user interface 36. This includes reading the chiller address for the individual control unit, CHLRADDR, the effective chiller capacity, CHLCAP, and the number of compressor stages, NUM_STEP, for each particular unit controller.

The next step 70 initializes several variables that will be utilized within the remainder of the program of FIG. 2. These variables include chilled water supply temperature, CHWSTEMP, which is set equal to the system chilled water set point, CHWSPT. The following variables are set equal to zero: ERROR, ERR_SUM, CAPRATIO, NEXTDROP, NEXTADD, UNITCAP$_O$ and NEXTCHLR.

Figure 4:
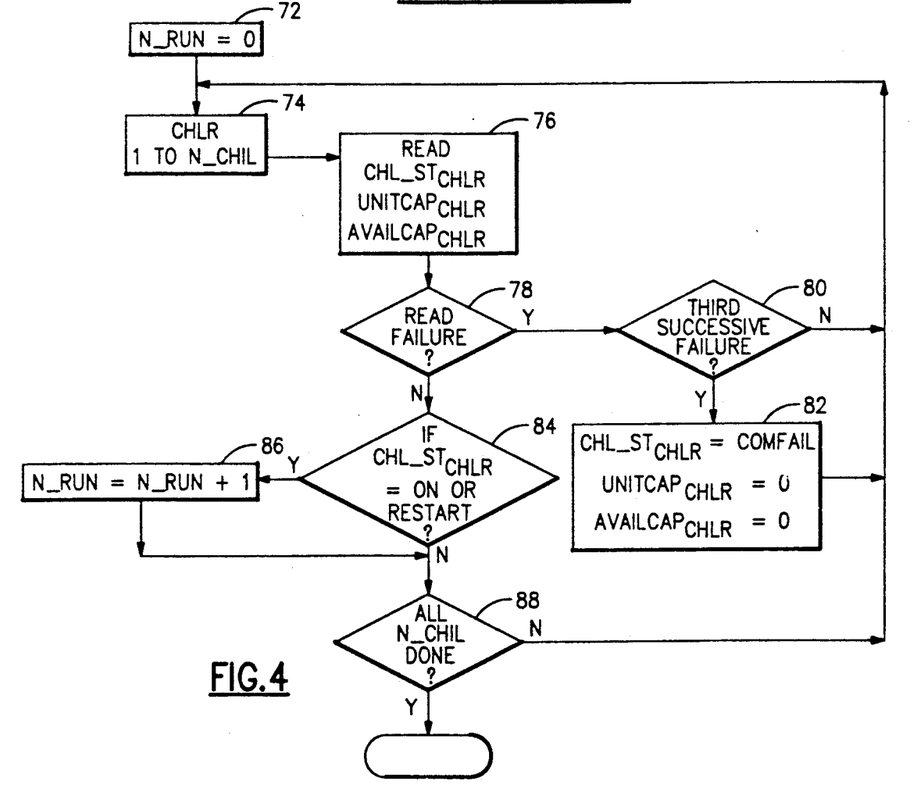
FIG. 4 is a diagram of a software routine which calculates the number of chillers currently running and reads their operating capacity parameters.

Referring now to FIG. 4, the routine for calculating the number of chillers currently running is set forth. This routine begins by setting a variable N_RUN equal to zero in a step 72 and entering a loop beginning with step 74 wherein each chiller from one to N_CHIL is read in a step 76 for chiller status, CHL_ST$_{CHLR}$, the percent unit capacity of compression for the given chiller unit, UNITCAP$_{CHLR}$, and the percentage of available compressor capacity that may be used, expressed as AVAILCAP$_{CHLR}$. In the event that these values cannot be successfully read for a given chiller unit, then an attempt will be made in steps 78 and 80 to read each of these values two more times. In the event that a given chiller unit controller cannot be read the third successive time then the chiller status, CHL_ST$_{CHLR}$ for that chiller is set equal to COMFAIL and the percent unit capacity, UNITCAP$_{CHLR}$, and available capacity, AVAILCAP$_{CHLR}$ are set equal to zero in a step 82. For each chilled status, CHL_ST$_{CHLR}$, that is successfully read, and is equal to "ON" or "RESTART" the variable N_RUN is incremented in step 86 by one. This will result in N_RUN finally storing a count of chillers that are running by the end of the routine defined by step 88.

Figure 5:
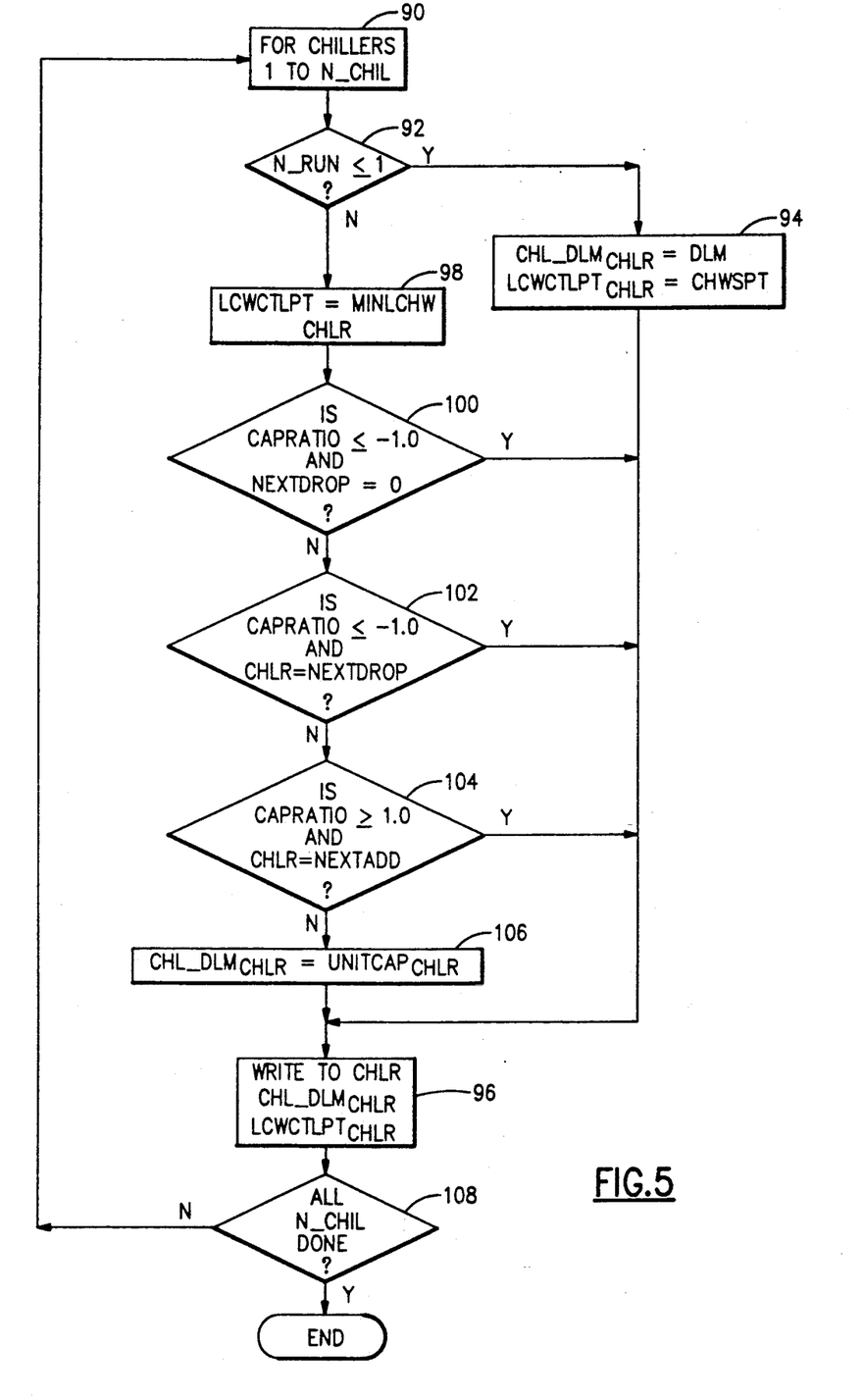
FIG. 5 is a diagram of a software routine which transmits demand limits and temperature set points to the chiller units of FIG. 1.

Referring to FIG. 5, the routine for transmitting the demand limit and the leaving chilled water control point for each chiller is illustrated in detail. It will be remembered that this is routine 48 in FIG. 2. This routine begins with a step 90 which defines a subscript variable, CHLR, that is to be incremented from one to N_CHIL. This subscript variable identifies certain parameters of a given chiller that are to be dealt with in a manner which will now be described. If N_RUN indicates that one or fewer chillers are actually running in step 92, then the active demand limit, CHL_DLM$_{CHLR}$ for each chiller is set equal to the system demand limit DLM and the leaving chilled water control point LCWCTLPT$_{CHLR}$ for each chiller is set equal to chilled water set point, CHWSPT in step 94. These values will subsequently be written to the respective control unit for the identified chiller in step 96. In the event that more than one chiller is running, a different path will be defined out of step 92 to a step 98. The leaving chilled water control point, LCWCTLPT$_{CHLR}$, for each chiller will be set equal to the minimum leaving chilled water control point, MINLCHW, in a step 98. This minimum leaving chilled water control point will be substantially different than the chilled water set point, CHWSPT. In this regard, the minimum leaving chiller water control point, MINLCHW, will be an artificially low value that cannot in fact be achieved by the chillers operating under the demand limit, CHL_DLM$_{CHLR}$, that is initially placed on each of them. This combination of the low value of MINLCHW and the demand limit, CHL_DLM$_{CHLR}$, for each chiller allows the system controller 32 to supervise the further adding or dropping of compressors in the chiller units in a manner which will be described in detail hereinafter.

The routine now proceeds to examine certain control parameters in steps 100, 102, and 104. These control parameters are CAPRATIO, NEXTDROP and the subscript variable, CHLR. It is to be appreciated that the variables, CAPRATIO and NEXTDROP will initially have the value of zero assigned to them in step 70. The subscript variable, CHLR, will on the other hand take an successive values of one, two and three for the three chillers 10, 12 and 14 of FIG. 1. This will cause the routine to immediately drop through to a step 106 for each numbered chiller allowing the demand limit for each chiller to be initially set equal to the percent unit capacity for that chiller. It will be remembered that this percent unit capacity is the percentage compression capacity of a chiller unit that is currently in use. The particular demand limit thus defined in step 106 and the leaving chilled water control point defined in step 98 will be written to the identified chiller control unit in step 96. The routine will loop around through step 108 and increment the subscript variable, CHLR until all chiller control units have had their demand limits and leaving chilled water control points defined in step 96.

Figure 6:
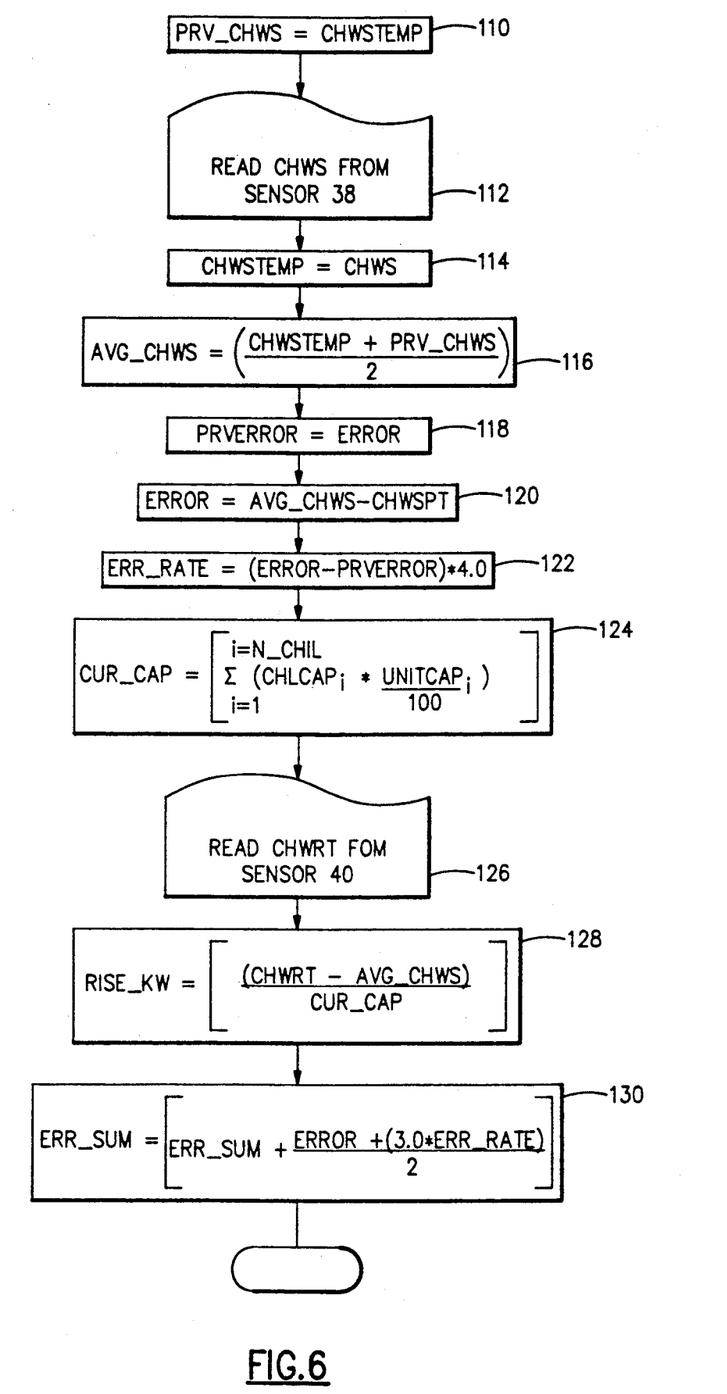
FIG. 6 is a diagram of a software routine which calculates certain system parameters for the overall system configuration of chiller units of FIG. 1.

Referring to FIG. 6, the routine 52 for calculating system parameters is illustrated in detail. The value of chilled water supply temperature, CHWSTEMP, is saved as PRV_CHWS in a step 110. The chilled water supply temperature, CHWS, is next read from the temperature sensor 38 and saved as the new value of CHWSTEMP in steps 112 and 114. The average chilled water supply temperature, AVG_CHWS, is next calculated in step 116 as being the average of the currently read chilled water supply temperature in step 114 and the previous chilled water supply temperature of step 110. The routine next proceeds to a step 118 and saves the current value of ERROR in the variable PRVERROR. The routine then calculates an error between the average chilled water supply temperature AVG_CHWS and the chilled water set point, CHWSPT. It will be remembered that CHWSPT was read in step 66 as one of the system parameters provided by the user interface. The routine now calculates an error rate ERR_RATE in a step 122 which is the differential between the currently calculated error of step 120 and the previous error of step 118 multiplied by four. The significance of the number four is that the entire program of FIG. 2 is run once every fifteen seconds so that a multiplication by four of the differential between current and previously calculated error effectively gives an error rate that is expressed per minute of unit time.

The routine will next determine the current capacity being used in the system by all chillers in a step 124. This is accomplished by multiplying the effective capacity, CHL CAP, times the percent unit capacity, UNITCAP, divided by one hundred for each chiller that has been noted in the sub routine 46 as having a status of either being "on" or "restart". The results for each chiller are thereafter summed in step 124 to be the value of CUR_CAP.

The routine of FIG. 6 now proceeds to a step 126 and reads the chilled water return temperature, CHWRT from sensor 40. The variable, RISE_KW, is next calculated in a step 128. Referring to step 128, the difference between the chilled water return temperature, CHWRT, read from sensor 40 in step 126 and the average chilled water supply temperature, AVG_CHWS, calculated in step 116 is divided by the calculated current capacity being used in the system, CUR_CAP, determined in step 124. The calculated result is expressed in degrees of Fahrenheit temperature per kilowatt unit of thermal energy. This result is used as an indication of how much cooling is being achieved per unit of chilling capacity being operated by the system. The routine now proceeds to a step 130 and calculates a value for the variable, ERR_SUM, which is a summation of three times the error rate, ERR_RATE, calculated in step 122 plus the error, ERROR, calculated in step 120 divided by two plus the previous error sum, ERR_SUM. It is to be appreciated that this calculation will initially be an averaging of the error plus three times the error rate since error sum is initially set equal to zero in step 70. This step will ultimately be an integration or summation as the routine continues to execute relative to a previous calculated error sum.

Figure 7:
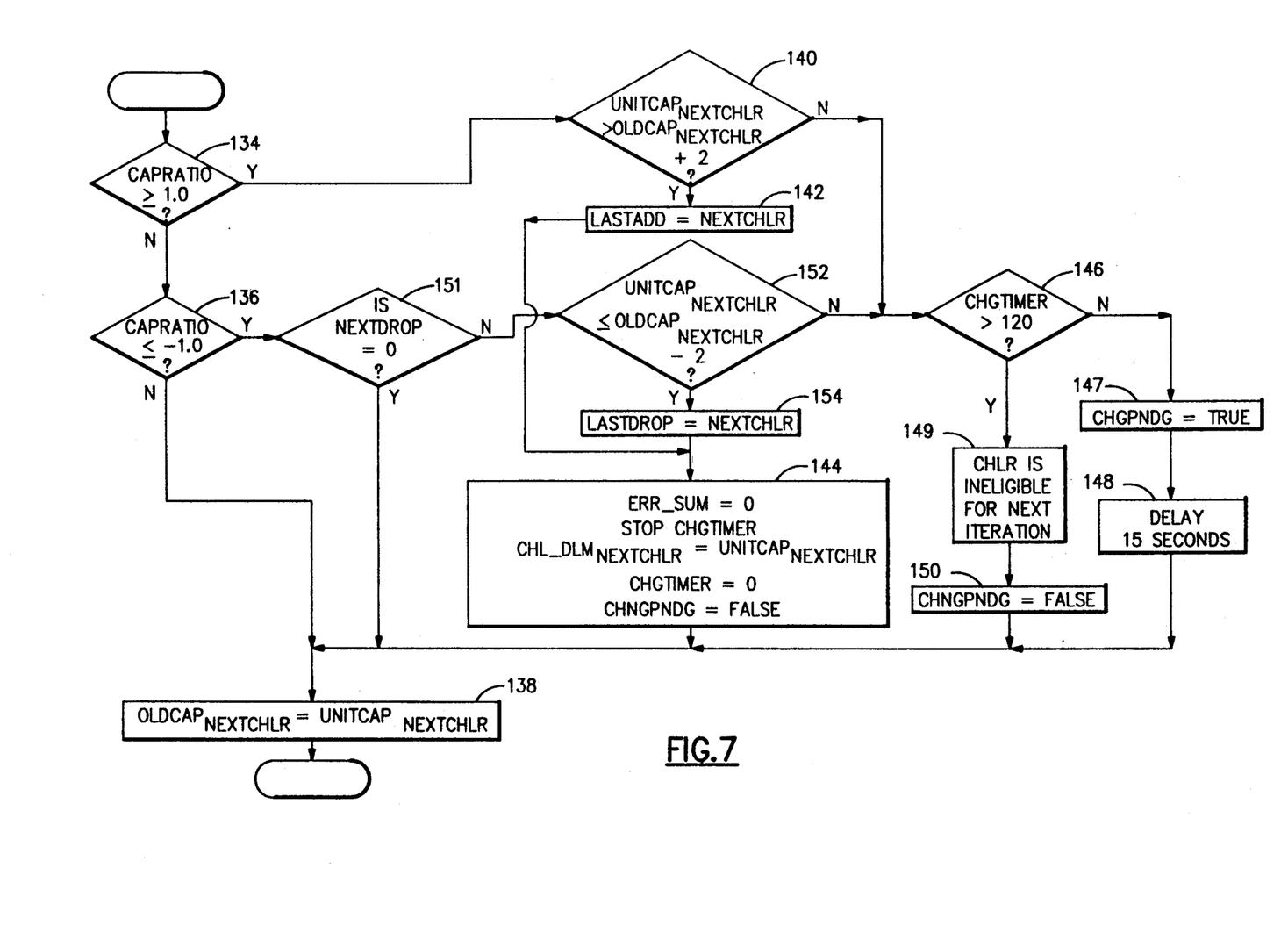
FIG. 7 is a diagram of a software routine which checks to see whether a change has occurred in a chiller unit pursuant to an ordered change by the supervisory control system of FIG. 1.

Referring now to FIG. 7, the routine 54 of FIG. 2 which calculates whether a change is pending is illustrated in detail. This routine begins with a series of steps 134 and 136 which inquire as to whether CAPRATIO is greater than or equal to one (step 134) or less than or equal to minus one (step 136). If CAPRATIO is anything between these limits the routine proceeds to a step 138 and sets a variable OLDCAP$_{NEXTCHLR}$ equal to the value of the percent unit capacity of the chiller identified by the variable UNITCAP$_{NEXTCHLR}$. It will be remembered that UNITCAP$_{CHLR}$ is read in for each chiller in step 76 and is therefore available for a given chiller. The particular percent unit capacity that is however initially chosen in step 138 is the one that is identified by the initial value of the subscript NEXTCHLR. Since the value of NEXTCHLR is initially set equal to zero, this will mean that percent unit capacity for an imaginary chiller number zero will be initially selected. The percent unit capacity for this imaginary chiller is UNITCAP$_O$, which is defined in step 70 as being zero.

Referring again to step 134, if CAPRATIO is greater than or equal to one, then an increase in capacity is pending. As will be explained in detail hereinafter. The routine proceeds to a step 140 and inquires as to whether the percent unit capacity of the next chiller that has been selected to add a stage of compression has in fact done so. This is accomplished by inquiring as to whether the value of the percent unit capacity, UNITCAP$_{NEXTCHLR}$ is greater than that chiller's old percent unit capacity, OLDCAP$_{NEXTCHLR}$, plus two percent. The two percent value is arbitrarily chosen to cover any possible sizes of capacity that may be added from a possible two percent to fifty percent.

If the percent unit capacity, UNITCAP$_{NEXTCHLR}$, has in fact increased by two percent, then the identified chiller value stored in the variable, NEXTCHLR, is stored in the variable LASTADD in a step 142. Referring to the next step 144, the following is seen to occur: ERR_SUM previously calculated in step 130 is set equal to zero as is a change timer variable, CHGTIMER. The latter variable is a software clock which will have been steadily increasing in time as will become apparent hereinafter. The chiller demand limit for the chiller identified by NEXTCHLR will be set equal to the value of its percent unit capacity, UNITCAP$_{NEXTCHLR}$. Finally a change pending variable, CHNGPNDG, will be set equal to "false". The routine will proceed to step 138 and set the finally achieved percent unit capacity of the identified chiller equal to the "old capacity" for that chiller.

Referring again to step 140, if a pending change in UNITCAP$_{NEXTCHLR}$ has not yet occurred, then the change timer clock variable, CHGTIMER, is checked in a step 146. Changes in UNITCAP$_{NEXTCHLR}$ are allowed to occur for a period of up to one hundred twenty seconds. If the change timer has not expired, the routine proceeds to step 147 and sets the variable change pending, CHGPNDG, equal to "true". The routine will thereafter implement a delay of fifteen seconds in a step 148. Following the fifteen second delay, the routine will exit through step 138 which performs the old capacity calculation.

Referring to FIG. 2, upon exiting the routine 54, the change pending status is queried. If the change pending variable, CHGPNDG equals "true" the program proceeds back to subroutine 46 and again executes subroutines 46 through 52 before again encountering the routine 54 of FIG. 7. This will continue to occur until the change timer expires in step 146 or the unit capacity has increased in step 140. When time expires before unit capacity increases, the chiller is removed from selection eligibility in a step 149 and the variable CHGPNDG is set equal to false in step 150 before the routine exits through step 138. Referring again to step 56 in FIG. 2, once the variable, CHGPNDG, is false, the program will no longer execute the change pending loop back to routine 46.

Referring again to step 134 in FIG. 7, if CAPRATIO is not greater than or equal to one, the routine proceeds to step 136 and determines whether CAPRATIO is less than or equal to minus one. In the event that the determination is "yes" than a decrease in capacity is pending. This may be due to the variable, NEXTDROP, being equal to zero in step 60 which is a special case of the capacity decreasing which will be explained hereinafter. If this special case is occurring, it will be detected in a step 151 and the routine will proceed to exit through step 138 after doing an old capacity calculation.

Referring again to step 151, if NEXTDROP is not equal to zero, than a decrease is pending in the chiller identified by the variable, NEXTCHLR, and the routine proceeds to steps 152, 154 and again 144 in much the same manner as has been previously described with regard to the processing of a change in unit capacity in steps 140 and 142. In the event that a decrease has yet to occur, then the steps 146-150 are appropriately utilized with step 56 also being encountered depending on the status of the change pending variable, CHGPNDG as previously discussed.

Figure 8A:
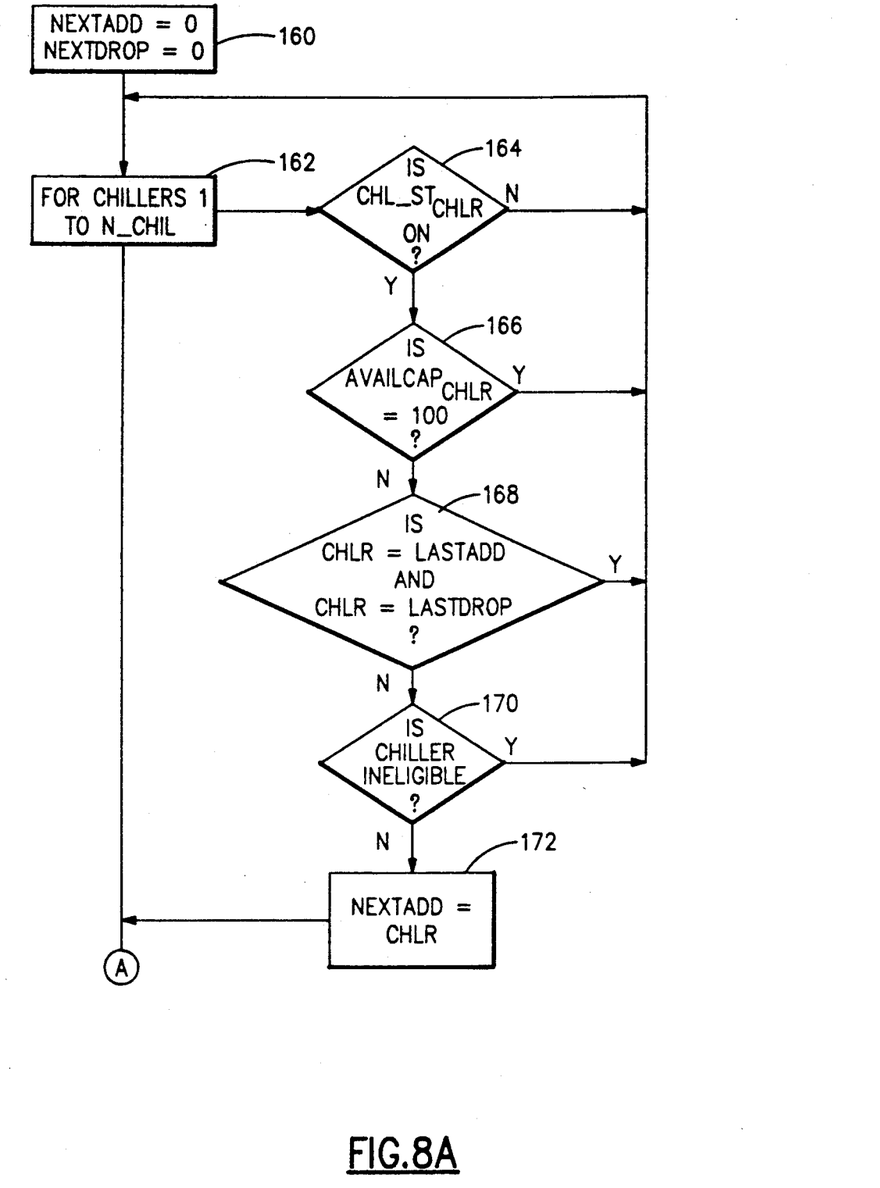
FIGS. 8A and 8B are a diagram of a software routine which selects the next chiller units in which a stage of compression is to be added or deleted.

Referring to FIG. 8A, the routine 64 of FIG. 2 is further illustrated. This routine computes both the next chiller to add a stage of compression as well as the next chiller to drop a stage. In this regard, the variables NEXTADD and NEXTDROP are initially set equal to zero in a step 160. The routine proceeds in a step 162 to identify the next chiller that is to add a stage. This is accomplished by identifying the first chiller to have a status of "on" in a step 164 and to also not have an available capacity of one hundred percent as determined in a step 166. The chiller must also have not been the last to drop a stage of capacity and to also have added a stage capacity as indicated by LASTADD and LASTDROP in a step 168. The routine shall finally exclude any chiller that was declared ineligible in a step 170 if it failed to execute its last commanded change. It will be remembered that a chiller may be ruled ineligible in step 149 if it failed to implement a change in capacity within the predefined period of time. The first chiller to pass each of the inquiries 164 through 170 is identified in step 172 as the next chiller to add a stage of compression. This is done by storing the chiller's number, CHLR, in the variable NEXTADD.

Figure 8B:
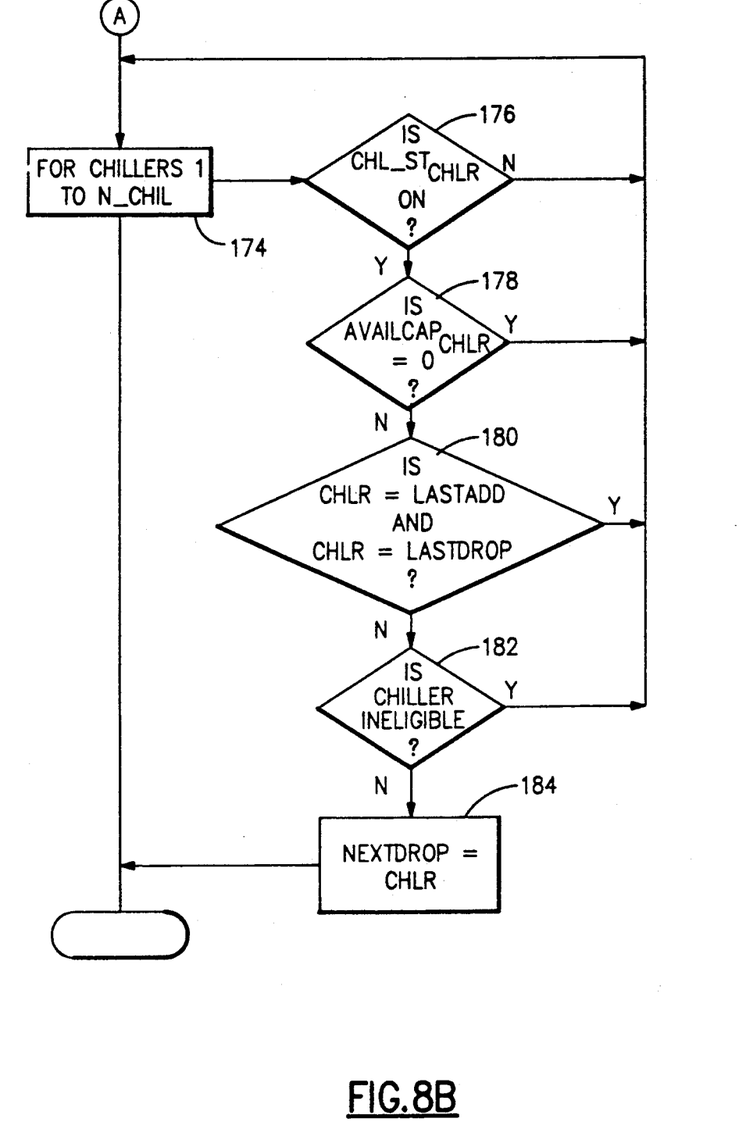

Referring to FIG. 8B, step 174 defines a successive interrogation of each chiller unit's controller for the purpose of identifying the next chiller that is to drop a stage of compression. Step 176 determines whether the chiller is on, step 178 determines whether the chiller has an available capacity greater than zero and whether the chiller was last to drop a capacity followed by a request to add capacity as indicated in step 180. Finally the chiller is excluded if it has been previously declared ineligible in step 149 because it failed to execute its last command as indicated by step 182. The first chiller to successively pass each of these thresholds is identified in step 184 by setting the variable NEXTDROP equal to the identified chiller number.

Figure 9:
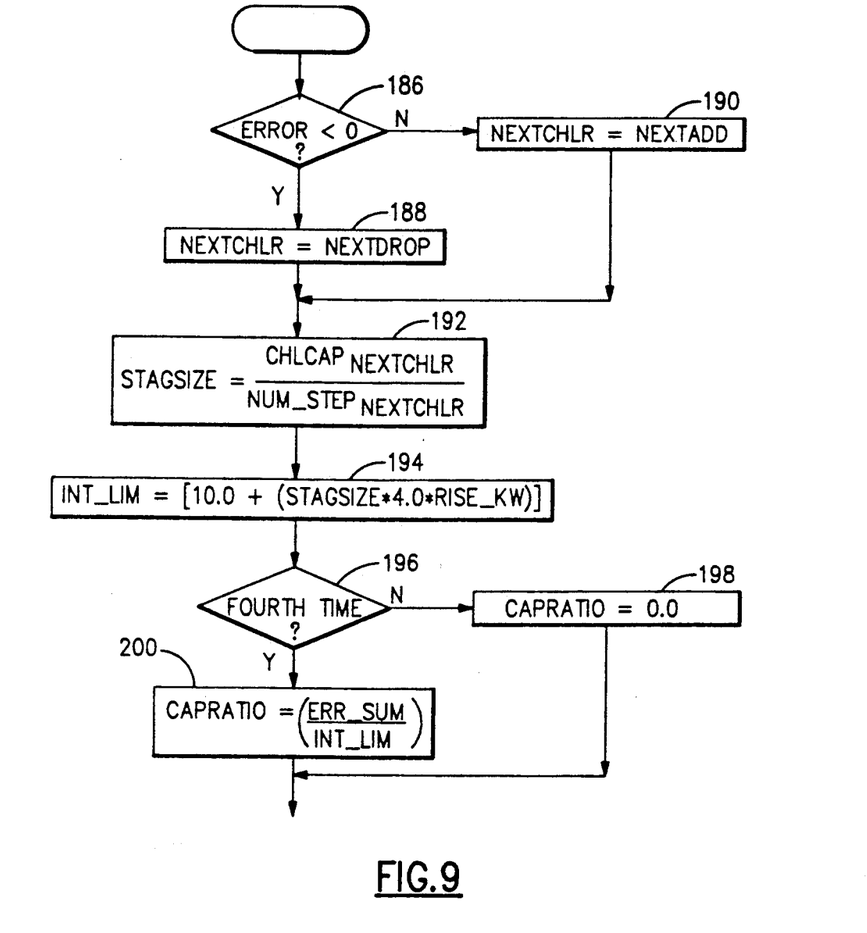
FIG. 9 constitutes a diagram of a software routine that calculates and otherwise defines a parameter used to authorize a change in the demand limit of one or more chiller units.

Referring now to FIG. 9, the routine 65 of FIG. 2 for calculating CAPRATIO is illustrated in detail. This routine begins with a step 186 which follows the end of the previous routine for selecting the next chiller to add a stage of compression or the next chiller to drop a stage of compression. Referring to step 186, the variable, ERROR, is checked for being less than zero. It will be remembered that the value of this particular variable is calculated in a step 120 and reflects the difference between the average chilled water supply temperature and the chilled water set point. If the value of ERROR is less than zero, than the next chiller that is to drop a stage as indicated by NEXTDROP is stored in the variable NEXTCHLR in step 188. If on the other hand, the error is greater than or equal to zero, the routine stores the identification of the next chiller to add a stage, NEXTADD in the variable NEXTCHLR in a step 190. Whichever chiller is identified in either step 188 or step 190, the routine proceeds to a step 192 and calculates STAGSIZE for this specified chiller. This is essentially a calculation of the chilling capacity of a given stage of compression that is to be added or deleted for the identified chiller, NEXTCHLR divided by the number of stages of compression for that chiller. The calculation is premised on knowing the chilling capacity and number of compression stages of the specified chiller as a result of having read and stored these values for that chiller in step 68. It is to be understood that STAGSIZE will be a value of the chilling capacity per stage of compression of the selected chiller expressed in kilowatts per stage.

The routine proceeds to calculate the integration limit for the identified chiller, INT_LIM, in a step 194. It is to be noted that this is calculated by multiplying the previously calculated value of STAGSIZE by a factor of four and further multiplying the result by the value of RISE_KW and adding ten to the resulting product. It will be remembered that the value of RISE_KW was previously calculated in step 128 of the system parameter routine as being the difference between the chilled water return temperature and the average chilled water supply temperature divided by the value of current capacity of the system. It is to be appreciated that this calculated value is expressed in degrees of Fahrenheit temperature per unit of chilling capacity. Referring again to step 194, it is to be appreciated that a multiplication of the value of RISE_KW times the value of STAGSIZE will yield degrees of temperature in Fahrenheit per stage.

The routine proceeds to a step 196 and determines whether or not the aforementioned sequence of steps 186 through 194 has occurred for the fourth time. If not, the value of CAPRATIO is set equal to zero in a step 198. At the fourth time, the routine calculates the value of CAPRATIO in step 200 as being the value of ERR_SUM divided by the value of INT_LIM. It will be remembered that ERR_SUM is calculated in step 130 of the system parameter calculation routine. This is essentially an integrated error calculation comprising the summation of the system's currently calculated error and error rate values plus the previous value of ERR_SUM and is expressed as degrees of Fahrenheit temperature. As has been noted, above, INT_LIM is expressed as degrees of temperature in Fahrenheit per stage. This means that the variable CAPRATIO is a ratio of degrees of Fahrenheit temperature divided by degrees of Fahrenheit per stage which yields "stages". This result expressed in terms of number of stages, is used to indicate that a stage of chilling should be added if it is plus one or dropped if it is minus one.

It is to be appreciated that at this point in time the value of CAPRATIO is either the result of the calculation of steps 198 or 200. The value of CAPRATIO that has been arrived at is next used in the routine of FIG. 10 to determine whether a change in the demand limit for an identified chiller is necessary. It will be remembered that this is a routine 62 in FIG. 2.

Figure 10:
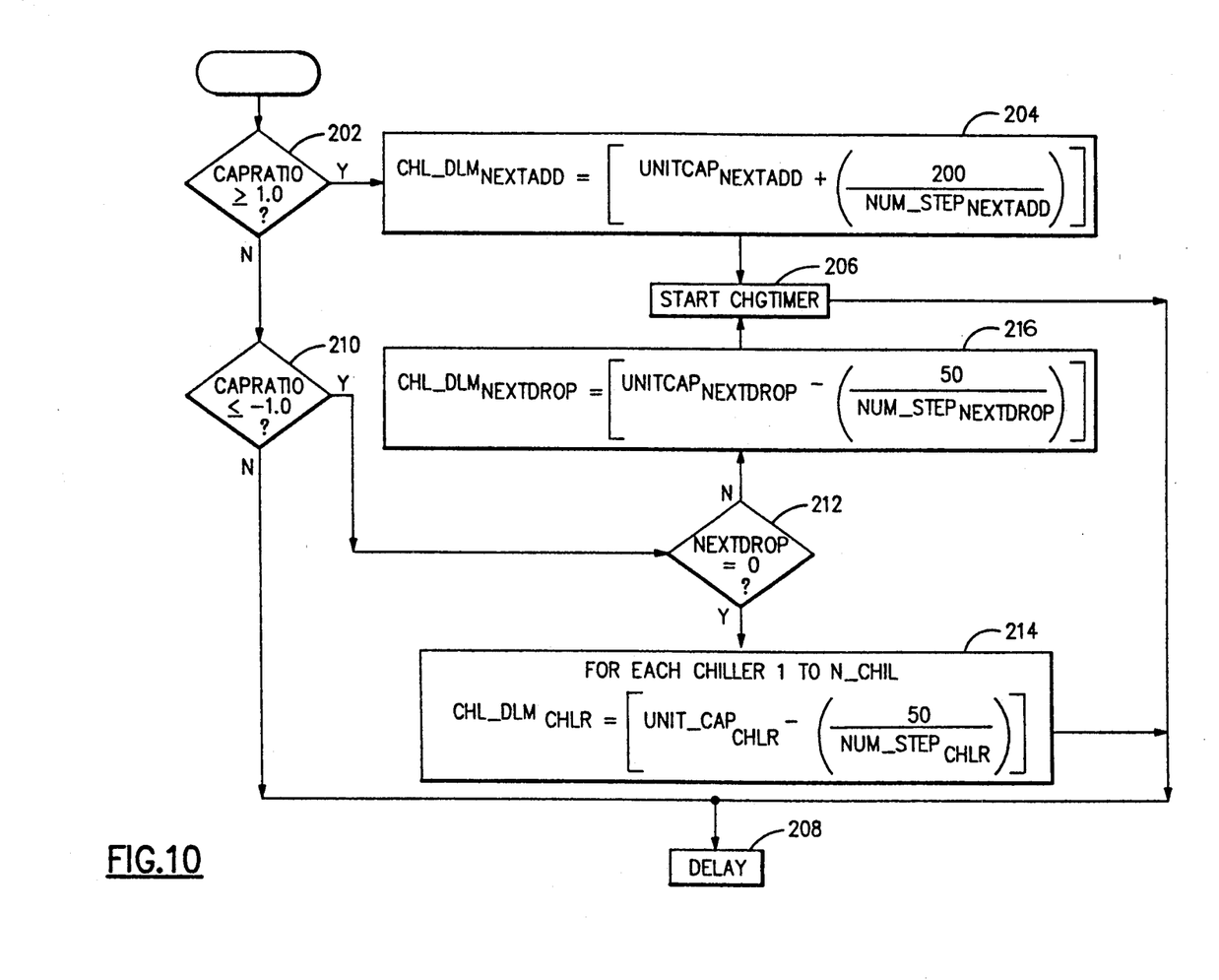
FIG. 10 is a diagram of a subroutine which calculates actual changes in demand limits of chiller units in response to a number of different conditions.

Referring to a step 202 in FIG. 10, if the value of CAPRATIO is greater than or equal to one, then the routine proceeds to a step 204 and calculates a chiller demand limit, $CHL\_DLM_{NEXTADD}$, for the chiller that has been previously identified as the chiller to next add a stage of compression. It will be remembered, that this chiller is identified by the variable NEXTADD in step 172 of the routine of FIG. 8. The demand limit for this identified chiller is calculated as being equal to the percent unit capacity, $UNITCAP_{NEXTADD}$, for the identified chiller plus an increment thereto. The increment is defined by the number two hundred divided by the number of stages of compression, NUM_STEP, for the identified chiller. The number two hundred is chosen so that the ratio "$200/NUM\_STEP_{NEXTADD}$" will be two times the likely percentage of the average stage size. This allows for the addition of the largest potential chilling stage that can be added. Once the new demand limit has been calculated, the routine proceeds to a step 206 and starts a change timer clock denoted as CHGTIMER. The routine now proceeds to a step 208 which marks the end of the routine of FIG. 10. Step 208 will initiate any delay that is necessary in order to define a sufficient amount of time that needs to elapse before the routine of FIG. 10 actually ends. This preferably is enough time to allow the program of FIG. 2 to execute every fifteen seconds. Referring to FIG. 2, it is to be appreciated that upon exiting routine 62 of FIG. 10 the program returns to routine 46 whereupon a new calculation of the number of chillers running is made. The program will thereafter address the demand limit and control point situation in the routine 48. Referring to FIG. 5, the subroutine 48 is illustrated in detail. Since CAPRATIO is greater than one, step 104 will be triggered when the identified chiller to add a stage is encountered. The chiller demand limit for that chiller as calculated in step 204 will next be written to the control unit for that chiller in step 96. At this point, the chiller control unit is authorized to actually increase the compression capacity of the given chiller unit. The program of FIG. 2 will thereafter check in subroutine 54 to determine whether the change in the unit capacity has in fact occurred. This is accomplished in step 140 of FIG. 7 wherein the percent unit capacity of the next chiller designated to add capacity is examined for whether such has occurred. Since the variable NEXTCHLR was set equal to NEXTADD in step 190, the chiller examined in step 140 will be the same chiller whose demand limit was increased in step 96. In the event that the change occurs before the change timer has clocked out, the program proceeds to denote the chiller as being the "last to add" in step 142 and thereafter resets the parameters of ERR_SUM, $CHL\_DLM_{NEXTCHLR}$, CHG_TIMER and CHNGPNDG in step 144. The variable, OLD_CAP, denoting the old capacity of the chiller unit will also be updated in step 138 before the system is again ready to select the next chiller that will add a stage of compression in the routine 64. It is to be appreciated that the program of FIG. 2 will continue increasing demand limits of selected chillers until the value of CAPRATIO is deemed acceptable in the routine 62 of FIG. 10 so as to not require any further changes in the demand limits for the chillers of the system.

Referring again to FIG. 10, and in particular to a step 210, if CAPRATIO is at anytime less than or equal to minus one, the routine proceeds to a step 212 and inquires as to whether the variable NEXTDROP is equal to zero. It will be remembered from steps 58 and 60 that this will occur when the chilled water return temperature is less than the chilled water set point. When this condition occurs the routine 62 proceeds from step 212 to a step 214 in FIG. 10 and calculates a demand limit for each of the running chillers. This demand limit is seen to be the unit capacity, $UNITCAP_{CHLR}$ for each chiller minus the constant fifty divided by the number of compressor stages for each chiller. The number fifty is chosen so that the ratio of "$50/NUM\_STEP_{CHLR}$" is equal to one-half the percentage of an average stage size's percentage of total capacity. It is to be appreciated that this calculation is defining the percentage capacity of the smallest stage of compression so that only one stage will be dropped in each chiller.

As has been previously noted, the routine will exit after an appropriate delay in step 208 whereupon the program of FIG. 2 will loop around eventually to the demand limit and control point routine 48 of FIG. 5. In this instance, step 100 will cause the calculated demand limits of step 214 to be written to each respective chiller unit in step 96. Once the demand limits for each chiller have been written to the control units of each chiller, the program will proceed through step 50, subroutine 52 and hence to subroutine 54. Since CAPRATIO is minus "1.1" in this instance and NEXTDROP equals zero, the routine 52 will proceed through steps 136 and 151 to a step 138. Since the variable NEXTCHLR has been previously set equal to zero in step 60, the variable $UNITCAP_{NEXTCHLR}$ will become $UNITCAP_O$ which has been set equal to zero in step 70. This means that the old capacity variable $OLDCAP_O$ will also be zero. The calculation of step 138 will have hence defined both a percent unit capacity and an old capacity that has no impact on any of the chillers 1 to N_CHIL that have had their demand limits changed. This essentially avoids any analysis of the change in capacity of the system for this situation. The program will next inquire as to whether chilled water return temperature is still less than chilled water set point in step 58 of FIG. 2. It is to be appreciated that the program will continue to cycle through steps 58 and 60, and hence to step 214 of subroutine 62 until such time as the chiller demand limits for each chiller have been changed a sufficient number of times to correct for the detected temperature imbalance of step 58. This looping will terminate at that time and the program of FIG. 2 will return to normal operation.

Referring again to step 212 in FIG. 10, in the event that CAPRATIO is less than minus one and the variable NEXTDROP is not equal to zero than the routine of FIG. 10 will proceed to a step 216 and calculate the demand limit for the identified chiller that is to drop a stage of compression. This is the same demand limit calculation as set forth in step 214 only it is now being restricted to the chiller that has been identified by the variable NEXTDROP. The routine will proceed from step 216 to start the change timer clock and thereafter implement the delay of step 208 before eventually writing the calculated demand limit into the identified chiller in step 96 as a result of being triggered by step 102 in the routine 48. The decrease in unit capacity expected in the identified chiller will be checked for in step 152 of the routine 54. The change in unit capacity should occur within the time allotted by the change timer that is of course set in step 206 and measured in step 146. As has been previously discussed, if the unit capacity changes within the allotted time, the chiller is denoted as the last to drop a stage in step 154 and the values of ERR_SUM, CHL_DLM, CHG_TIMER, and CHNGPNDG are again reset in step 144. The program of FIG. 2 will continue to select chillers and selectively decrease demand limits until the CAPRATIO is within acceptable limits as required by the routine 62 of FIG. 10.

It is to be appreciated that a particular embodiment of the invention has been described. Alterations, modifications, and improvements thereto will readily occur to those skilled in the art. Such alterations, modifications and improvements are intended to be part of this disclosure even though not expressly stated herein and are intended to be within the scope of the invention. Accordingly the foregoing description is by way of example only. The invention is limited only as defined in the following claims and the equivalents thereto.

What is claimed is:

1. A process for selectively adding or dropping stages of compression within discrete chiller units each having dedicated control units for normally adding or dropping stages of compression, said process comprising the steps of:

defining a demand limit on the compression capacity in each respective chiller unit that may be activated by the dedicated control unit for that respective chiller unit;

changing the demand limit on the compression capacity of a chiller unit when a desired coolant temperature is not being achieved by the collective compression capacity of all discrete chiller units that have been activated by their respective control units, whereby the dedicated control unit for the chiller unit changes the number of stages of compression in that respective chiller unit; and changing the demand limits on the compression capacities of all chiller units when the returning coolant temperature is below a predefined threshold value.

2. The process of claim 1 further comprising the step of:

dropping a stage of compression in each chiller unit in response to said step of changing the demand limits on the compression capacities of all chiller units when the returning coolant temperature is below a predefined threshold value.

3. The process of claim 1 wherein said step of changing the demand limits on the compression capacities of all chiller units comprises the steps of:

obtaining a representation of the amount of compression capacity currently being utilized by each chiller unit; and subtracting a calculated amount of the compression capacity of each chiller unit from the amount of compression capacity currently being utilized so as to define new demand limits for each chiller unit.

4. The process of claim 3 wherein said step of changing the demand limits on the compression capacities of all chiller units further comprises the step of:

calculating an amount of compression capacity to be subtracted from a given chiller unit's compression capacity currently being utilized, the calculated amount being sufficient to include the smallest stage of compression for that chiller unit.

5. The process of claim 1 further comprising the steps of:

sensing the temperature of the returning coolant; and
further changing the demand limits on the compression capacities of all chiller units until the sensed temperature is at least equal to the threshold value.

6. The process of claim 1 further comprising the steps of:
disabling the step of changing the demand limit on the compression capacity of a chiller unit when the returning coolant temperature is below a predefined threshold level.

7. The process of claim 1 further comprising the steps of:
determining when an additional stage of compression should be added to or dropped from the collective compression capacity of all discrete chiller units that have been activated by their respective dedicated control units; and
triggering said step of changing the demand limit on the compression capacity of one chiller unit in response to said step of determining when an additional stage of compression should be added to or dropped from the collective compression capacity of all the active discrete chiller units.

8. The process of claim 7 wherein said step of changing the demand limit on the compression capacity of a chiller unit comprises:
identifying the chiller unit that is to receive a change in demand limit;
calculating a new demand limit for the identified chiller unit, and
transmitting the demand limit to the dedicated control unit for the identified chiller unit.

9. The process of claim 8 wherein said step of identifying the chiller unit that is to receive a change in demand limit comprises the steps of:
designating the next chiller unit that is to add a stage of compression;
designating the next chiller unit that is to drop a stage of compression;
identifying the designated next chiller that is to add a stage of compression as the chiller unit to receive a change in demand limit when the temperature of the coolant leaving the chiller units is greater than the desired coolant temperature; and
identifying the designated next chiller that is to drop a stage of compression as the chiller unit to receive a change in demand limit when the temperature of the coolant leaving the chiller units is less than the desired coolant temperature.

10. The process of claim 9 wherein said step of calculating a new demand limit for the identified chiller unit comprises the steps of:
obtaining the amount of compression capacity currently being used by the identified chiller unit;
adding a calculated amount of compression capacity of the identified chiller unit to the amount of compression capacity currently being used by the chiller unit when a stage of compression is to be added; and
subtracting a calculated amount of compression capacity of the identified chiller unit from the amount of compression capacity currently being used by the identified chiller unit when a stage of compression is to be dropped.

* * * * *